(12) United States Patent
Weber et al.

(10) Patent No.: US 10,462,367 B2
(45) Date of Patent: *Oct. 29, 2019

(54) IMAGE CAPTURE HAVING TEMPORAL RESOLUTION AND PERCEIVED IMAGE SHARPNESS

(71) Applicant: GVBB HOLDINGS S.A.R.L., Luxembourg (LU)

(72) Inventors: Klaus Weber, Modautal (DE); Ronny Van Geel, Zegge (NL)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,539

(22) Filed: Oct. 13, 2017

(65) Prior Publication Data

US 2018/0041703 A1    Feb. 8, 2018

Related U.S. Application Data

(63) Continuation of application No. 14/970,166, filed on Dec. 15, 2015, now Pat. No. 9,826,157.

(60) Provisional application No. 62/092,110, filed on Dec. 15, 2014.

(51) Int. Cl.
  *H04N 5/232*    (2006.01)
  *H04N 5/351*    (2011.01)

(52) U.S. Cl.
  CPC ....... *H04N 5/23251* (2013.01); *H04N 5/2327* (2013.01); *H04N 5/351* (2013.01); *H04N 5/23293* (2013.01)

(58) Field of Classification Search
  CPC .. H04N 5/23251; H04N 5/2327; H04N 5/351; H04N 5/23293
  See application file for complete search history.

(56) References Cited

U.S. PATENT DOCUMENTS

| 6,441,848 | B1 | 8/2002 | Tull | |
|---|---|---|---|---|
| 2007/0171298 | A1* | 7/2007 | Kurane | H04N 5/2353 |
| | | | | 348/362 |
| 2011/0149163 | A1* | 6/2011 | Nishi | G06T 5/003 |
| | | | | 348/607 |

FOREIGN PATENT DOCUMENTS

| CN | 101473266 A | 7/2009 |
|---|---|---|
| WO | 2009086849 A1 | 7/2009 |

OTHER PUBLICATIONS

International Search Report including Written Opinion from related PCT Application No. PCT/EP2015/079795 dated Feb. 25, 2016.

(Continued)

*Primary Examiner* — Twyler L Haskins
*Assistant Examiner* — Fayez Bhuiyan
(74) *Attorney, Agent, or Firm* — Arent Fox LLP (57) ABSTRACT

A camera for capturing video images in a series of frames includes an image sensor having an array of pixels. Each pixel receives an image and accumulates an electrical charge representative of the image during a frame. The camera also includes a pixel processor to sample a pixel output for each of the pixels of the image sensor during an intermediate portion of the frame to produce a signal representative of the image.

26 Claims, 9 Drawing Sheets

(56) References Cited

OTHER PUBLICATIONS

Communication pursuant to Article 94(3) EPC from related EP Application No. 15813774 dated Jun. 17, 2019.
Notification of the First Office Action from related CN Application No. 201580075943.3 dated Jul. 16, 2019, with English Translation.

* cited by examiner

IMAGE CAPTURE HAVING TEMPORAL RESOLUTION AND PERCEIVED IMAGE SHARPNESS

CROSS-REFERENCE TO RELATED APPLICATION

This application is a continuation of U.S. patent application Ser. No. 14/970,166, filed Dec. 15, 2015, which claims the benefit of U.S. Provisional Application Ser. No. 62/092,110, filed on Dec. 15, 2014, the contents of each of which are expressly incorporated by reference herein in their entirety.

BACKGROUND

Field

The present disclosure relates generally to image data. Aspects may be incorporated into cameras and may be used, e.g., to generate images for ultra high definition (UHD) displays.

Background

Ultra high definition (UHD) displays are used in a variety of applications, including televisions, personal computers and tablets, smart phones, and camera viewfinders. Reduced sharpness in such displays may occur due to relative motion of objects in the image. For camera viewfinders, a "motion blur" effect is caused by relatively long exposure time of each image (20 ms in a 50 Hz system and 16.6 ms in a 59.94 Hz system). As an object moves during an image exposure of a camera imager, details are lost as the object is spread over multiple pixels. One solution is to increase the number of frames that are being captured per second, reducing the exposure time of each individual frame as a consequence. All of these frames at the higher frame rate may be transmitted to the display to deliver sharper images but with great expense of signal bandwidth. In addition, as the camera generates more images per second, the amount of photons received by the image sensor per image diminishes, resulting in a lower light sensitivity of the camera and lower signal to noise ratio.

As an alternative to creating more images per second, the exposure could also be reduced by using an electronic shutter, to keep the number of frames per second the same and only shorten the exposure time of each image. This reduces the motion blur (as there's less time for movement) but also leads to a lower light sensitivity and in addition introduces a disturbing strobe effect (i.e., "judder"). Using this approach effectively produces zero exposure (i.e., blackness) within the frame when the shutter is closed, creating a gap between the images. The human eye will attempt to 'track' the object motion from frame to frame. A ball that flies through the air, could be razor sharp in each image, but as the camera image sensors only have captured short exposure moments, the visual trajectory information is lost and the ball seems to jump through the scene, lacking smoothness of motion. As the human visual system is 'trained' to track objects, this leads to a distracted viewing experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects presented herein provide for improved image performance and a reduction in image blur by capturing image sensor output at multiple points during an exposure. Information from the multiple points may be used in order to generate an improved signal representative of the image.

Aspects may include a camera, method, apparatus, system, and computer-readable medium for capturing video images in a series of frames includes an image sensor having an array of pixels. Each pixel receives light photons and accumulates an electrical charge in response to the received photons. A pixel processor samples the electrical charge accumulated by each of the pixels at least one time during an intermediate portion of a frame and processes the samples to produce a digital image, thus reducing motion blur on a display.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Certain aspects of video production systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "pixel processor" that includes one or more processors. Examples of processors include microprocessors, microcontrollers, image processors, digital signal processors (DSPs), field programmable gate arrays (FPGAs), application specific integrated circuits (ASICs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, non-transitory storage such as a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, as well as a carrier wave, a transmission line, and any other suitable medium for storing or transmitting software. The computer-readable medium may be resident in the processing system, external to the processing system, or distributed across multiple entities including the processing system. Those skilled in the art will recognize how best to implement the described functionality presented throughout this disclosure depending on the particular application and the overall design constraints imposed on the overall system.

Figure 1:
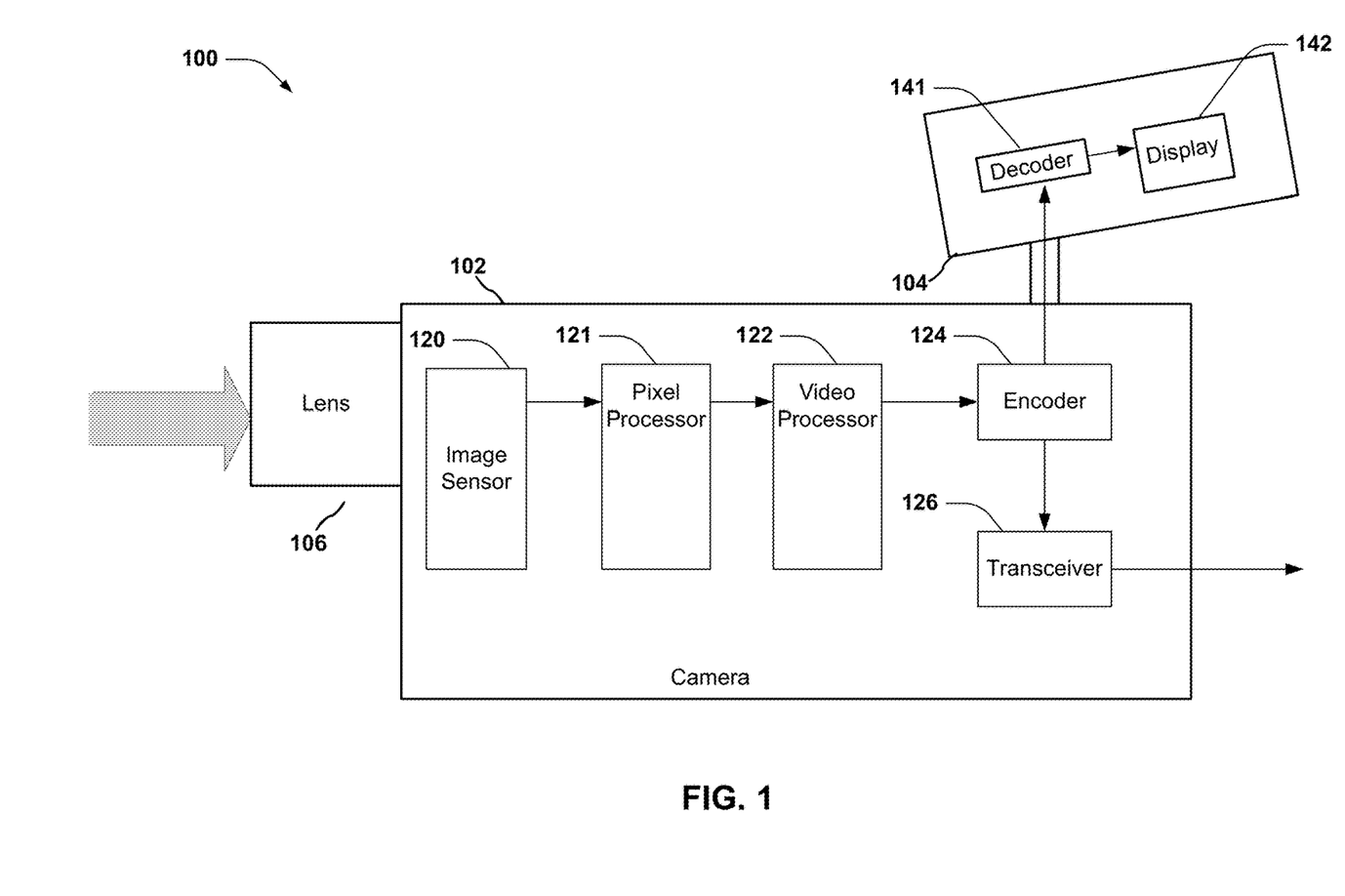
FIG. 1 is a block diagram of an example camera system 100 having a viewfinder display.

FIG. 1 is a simplified block diagram illustrating an example camera system 100 that implements a pixel processor 122. Camera system 100 may comprise a camera 102, the viewfinder 104, and a lens system 106. Camera 102 may include an image sensor 120, which may comprise an array of pixels to convert photons to electrical charges. Among others, the image sensor may comprise a charged coupled device (CCD) or complementary metal oxide semiconductor (CMOS). Thus, the array of pixels may comprise an array of CCD or CMOS pixels. An image is projected by the lens system 106 onto the image sensor 120. The output of the image sensor 120 comprises an output signal from the array of pixels. The image sensor 120 produces a voltage signal by converting the photon input level for each pixel to a proportional voltage signal for each pixel in the array. The pixels of the image sensor 120 are exposed to photons, e.g., projected by the lens system 106 and read by the pixels of the image sensor in time units of frame exposures. Each pixel accumulates an electrical charge representative of the image during the course of the exposure frame. The image sensor 120 may convert the electrical charge to an analog output voltage signal. Alternatively, the image sensor 120 may convert the electrical charge to an analog voltage and convert the analog voltage to a digital signal using an analog to digital converter, for example, to produce a digital output voltage signal. The image sensor 120 may transmit the output voltage signal periodically at the frame rate. The pixel may be reset by discharging the accumulated charge so that the next pixel charge accumulation for the next frame can begin. The amount of light photons may be converted to the voltage signal up to a saturation threshold, at which point no further charge can be accumulated for the pixel output. In one example, multiple image sensors 120 may operate in a synchronous manner. Multiple image sensors 120 may also operate in different phases relative to one another.

Pixel processor 121 may be configured to correct the image sensor pixel output signals for motion blur. The output of the pixel processor 121 may be an array of pixel signals to form an image for each frame exposure of the video sequence. Camera 102 includes a video processor 122 that receives a sequence of images and produces a digital video output having a desired frame rate, aspect ratio, etc. The video processor 122 may also perform white balance, color correction and gamma correction to the video images. The video processor 122 may be implemented as a plurality of separate processors each configured to perform one or more of the above functions. Alternatively, the pixel processor 121 and video processor 122 may be arranged in a reverse manner, whereby the pixel processor 121 processes images on a per pixel basis already corrected by the video processor 122.

An encoder 124 may receive a raw video output from video processor 122 and produce a formatted digital video signal encoded according to a particular specification (e.g., Serial Digital Interface (SDI), H.264/MPEG-4 Advanced Video Coding, or High Definition Multimedia Interface (HDMI)). The signal from encoder 124 may be output for transmission to a video production system and/or over a network using transceiver 126. Encoder 124 may also provide an encoded or raw video feed to viewfinder 104.

View finder 104 may include a decoder 141 configured to receive encoded video or raw video from encoder 124 and provide image data for the display 142. In one example, the display 142 may include an organic light-emitting diode (OLED) at each pixel, whereby a light-emitting diode (LED) is coated with an emissive electroluminescent layer formed from an organic compound which emits light in response to an electric current. These and other devices may be used to generate images on the display 142.

Lens system 106 may include one or more lenses and may be controlled to provide a desired optical configuration of lenses, which configuration may specify, for example, a depth of field setting, a numerical aperture, and a focal length.

Figure 2A:
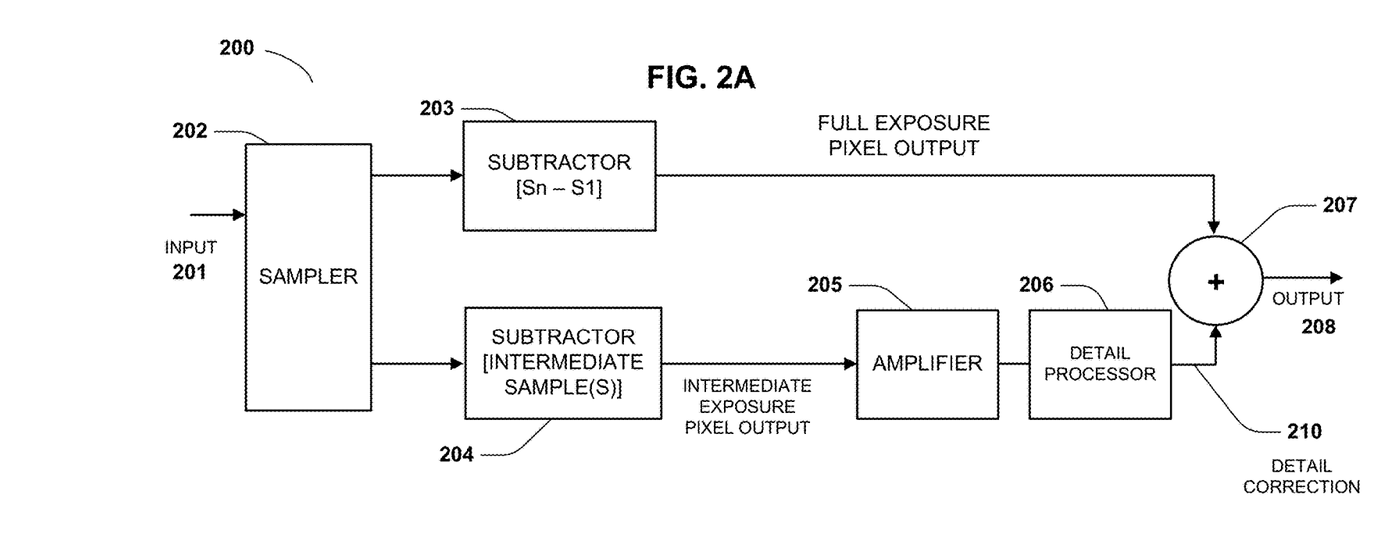
FIG. 2A is block diagram of an example detail correction circuit of a pixel processor enhanced by using an intermediate exposure for the detail correction signal.

FIG. 2A is block diagram of an example detail correction circuit 200 of the pixel processor 121 for sampling the image sensor 120 during an intermediate portion of the frame to produce a signal representative of the image. For each pixel of the image sensor 120, the sampler 202 receives input 201, which is the pixel output received from the image sensor 120. The sampler 202 may read the cumulative pixel output values (e.g., an electrical charge or output voltage signal values) at discrete time samples S1 to Sn. Samples S1 and Sn may occur at the beginning and end of an exposure frame, respectively, with one or more samples occurring between samples S1 and Sn. For example, with n=4, sample Sn=S4 occurs at the end of the frame exposure, a sample S2 may occur at about 25% of the full frame exposure interval, and a sample S3 may occur at about 75% of the full frame exposure interval. Alternatively, sample S2 may occur at about 33% of the full frame exposure interval, and a sample S3 may occur at about 66% of the full frame exposure interval. As an alternative example, with n=3, sample S3 occurs at the end of the exposure frame, and a sample S2 may occur anywhere between about 25 to 75% of the frame exposure. Other possible alternative variations for n>4 may be implemented, where sampler 202 provides additional samples of pixel output values within the full frame exposure. For a CMOS implementation of image sensor 120, the sampler 202 may operate as described above to read the multiple samples per exposure frame. In the case of a CCD implementation of image sensor 120, reading intermediate samples may not be possible within a single frame. Consequently, a CCD image sensor 120 may need to operate at a faster frame rate than the nominal rate for the camera 100 to simulate multiple samples within the nominal frame. For example, if the video signal for camera 100 is processed at rate of 50 FPS (20 ms frames), and sampler 202 requires four samples per frame (n=4), then the CCD image sensor 120 may operate at a faster rate of 200 FPS (5 ms frames), yielding 4 CCD images per 20 ms frame. Each set of samples S1 to S4 may then be derived from a block of four CCD images for an equivalent 20 ms frame.

A subtractor 203 determines the cumulative pixel output (e.g., electrical charge or output voltage signal value) for the full frame exposure by subtracting the pixel output value at sample S1 from the cumulative pixel output value at sample Sn. A subtractor 204 determines the cumulative pixel output value of an intermediate frame exposure by subtracting the cumulative pixel output value at sample S2 from cumulative pixel output value at sample S3. For the example of n=4, sample S2 at 25% of the exposure frame and sample S3 at 75% of the full frame exposure interval, the intermediate exposure provides the pixel output value for the middle 50% of the frame exposure. For the example where n=4, sample S2 occurring at about 33% of the frame exposure and sample S3 at about 66% of the full frame exposure, the intermediate exposure provides the pixel output for the middle third of the full frame exposure. Alternatively, for the example of n=3, sample S3 occurs at the end of the full frame exposure, and sample S2 at 50% of the full frame exposure, subtractor 204 may subtract the pixel output value at sample S2 from the pixel output value at sample S3 to provide an intermediate exposure value related to the last half of the full frame exposure. Alternatively, subtractor 204 may subtract the pixel output value at sample S1 from the pixel output value at sample S2 to provide an intermediate exposure value related to the first half of the full frame exposure.

Figure 2B:
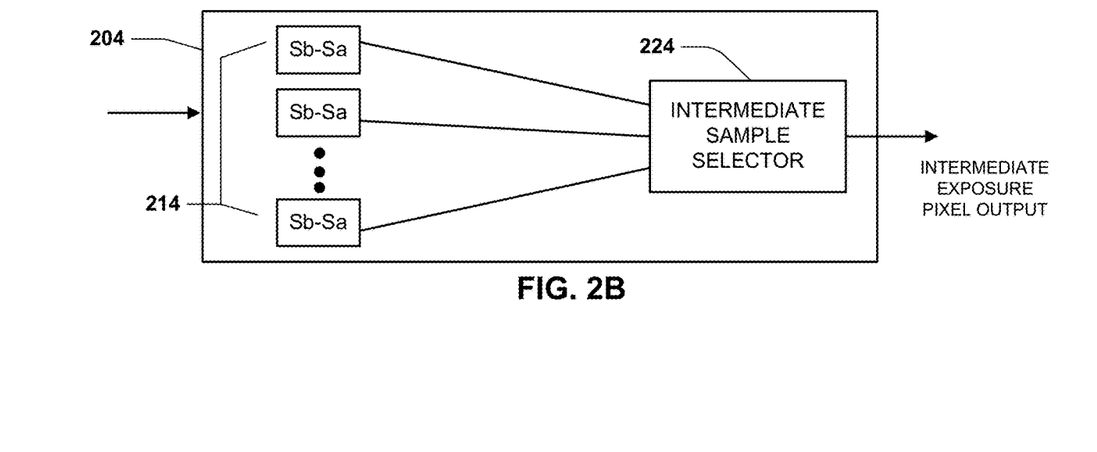
FIG. 2B is a block diagram of an example subtractor for determining multiple intermediate exposures.

FIG. 2B shows a block diagram for an example subtractor 204, in which multiple intermediate exposures may be determined. In an embodiment with sampler 202 reading samples Sn for n>4, multiple intermediate exposures may be obtained by subtractor 204 by using multiple subtractors 214 to each determine the respective intermediate exposure separately. For example, for n=6, intermediate exposures S6-S5, S5-S4, S4-S3, S3-S2 and S2-S1 may be determined by one or more subtractors 214. Selector 224 may be implemented as a multiplexer to adaptively select which intermediate exposure is to be processed by the detail correction circuit 200.

Amplifier 205 receives the pixel output of the intermediate frame exposure and amplifies it as a normalization to a full frame exposure. For example, the amplifier 205 may apply a 6 dB boost to the cumulative pixel output value. A detail processor 206 receives the amplified pixel output value and performs a detail correction algorithm to correct motion blur. The detail processor 206 improves the perceived image sharpness by generating a correction signal at any signal transition. Transitions in luminance and/or chrominance are emphasized by the detail processor 206 to enhance objects in a scene. The calculated detail correction is added to the original image on a pixel by pixel basis. This detail correction signal depends on the sharpness of the image. In this example, the intermediate exposure contains 50% of the motion blur for the pixel. By performing detail correction on the shorter intermediate frame exposure instead of the full frame exposure, the effect of motion blur in the pixel is reduced, which enhances the effectiveness of the detail correction. Summer 207 is configured to add the detail correction signal to the full exposure pixel output, giving an enhanced pixel output 208.

Figure 3:
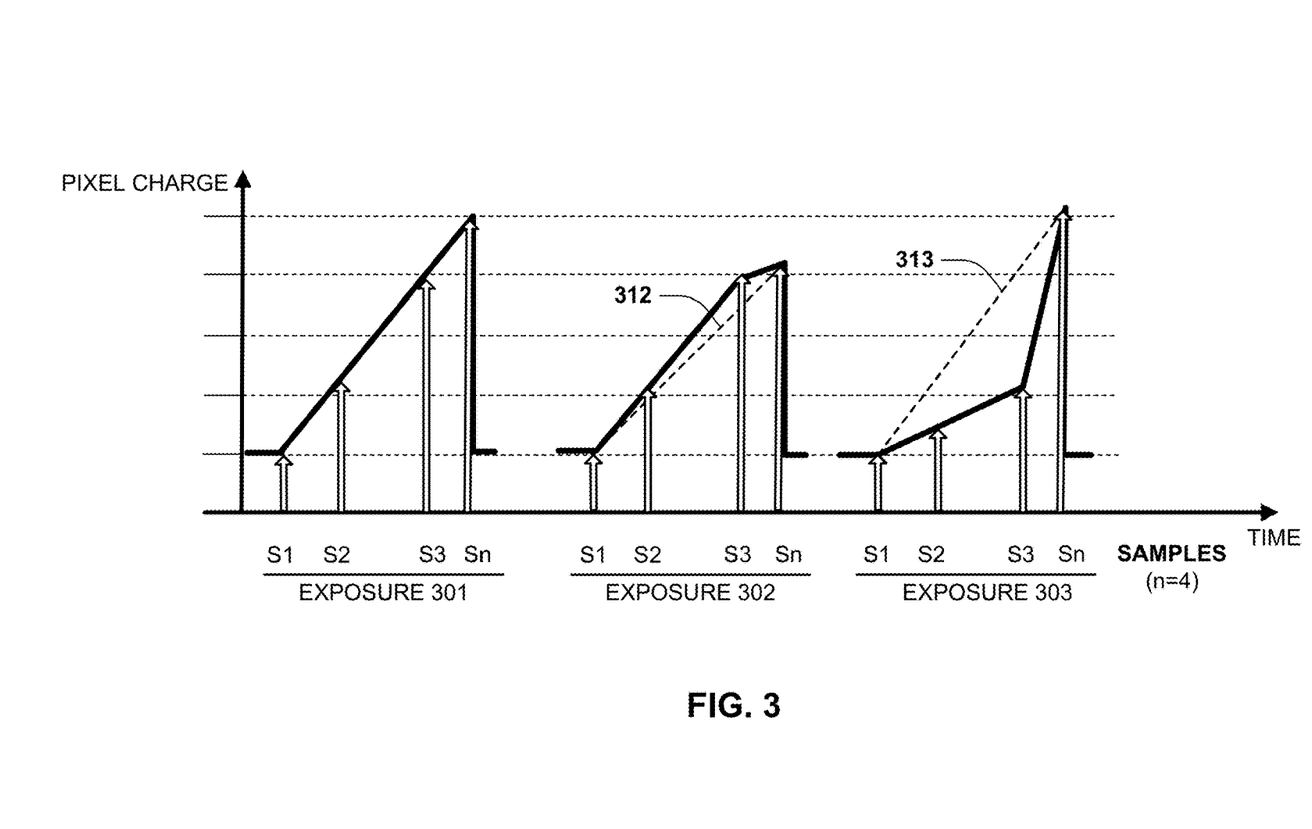
FIG. 3 a graphical illustration of example pixel charge rates during a sequence of exposures as an indication of motion presence.

FIG. 3 is a graphical illustration of an example sampling of an image sensor 120 pixel output for multiple samples S1 to Sn during a series of single frame exposures 301, 302, 303. In this example, n=4 and cumulative pixel output values are sequentially read at samples S1, S2, S3 and S4, with samples S1 and S4 providing the cumulative pixel output for a full frame exposure as sample S1 occurs at the beginning of the frame, and sample S4 occurs at the end of the frame. A pixel output of image sensor 120 for an intermediate frame exposure can be obtained between samples S2 and S3. For exposure 301, the constant slope of the accumulating pixel output during the interval between S1 and S4 indicates a constant photon input for this pixel, which means a constant light level is being reflected from an object in the camera field of view. Since the light level is constant, the object is likely fixed and not moving across this pixel unit within the frame exposure 301. In contrast, the frame exposures 302 and 303 illustrate pixel charge rate variation between each sample pair interval (e.g., Si and Si+1). For example, in exposure 302, the rate of pixel charge accumulation is constant between samples S1 and S2, S2 and S3, but falls between samples S3 and Sn, revealing the presence of motion for the pixel output, from a brighter object to a darker object, and hence the potential for motion blur. Exposure 303 shows the presence of motion as a transition from a darker object to a brighter object being sensed by the pixel of image sensor 120 (i.e., more light photons being sensed by the pixel), as the pixel charge rate increases between samples S3 and Sn compared to the pixel charge rate between S1 and S3. Thus, with the sampler 202 configured to track intermediate exposures within each frame, (e.g., between samples S2 and S3), motion is detectable. In contrast, a conventional approach which measures pixel output only at the beginning of the frame and at the end of the frame (i.e., at samples S1 and Sn) would give misleading pixel charge rates 312 and 313, and overlook the indication of motion.

Figure 4:
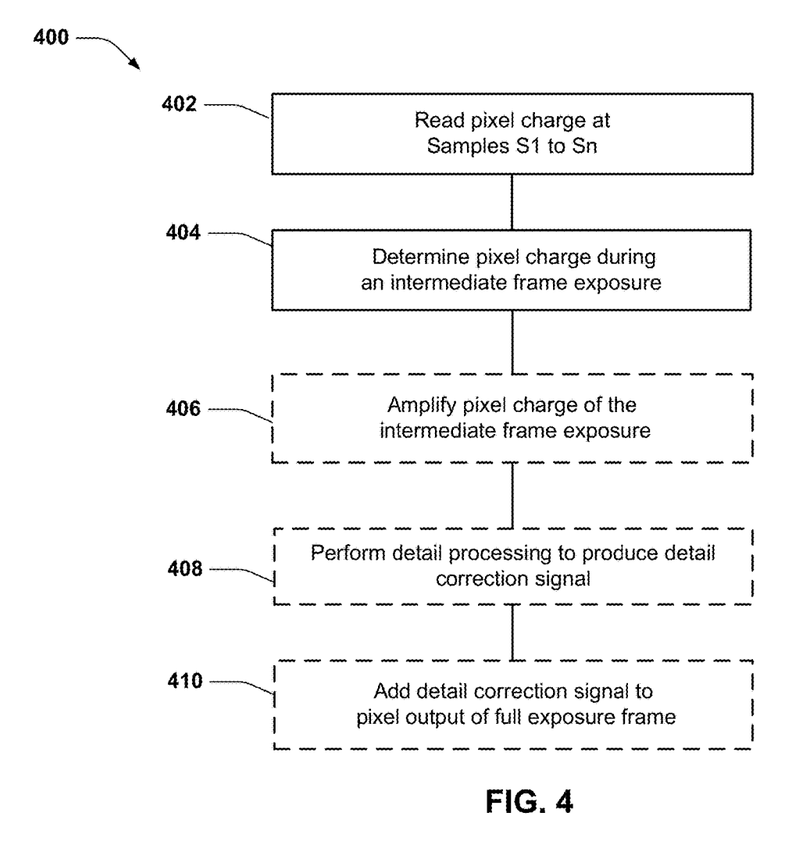
FIG. 4 is a flowchart of an example method for applying an intermediate exposure for the detail correction signal.

FIG. 4 shows a flowchart of an example method 400 to implement the detail correction circuit 300. In step 402, a pixel output value (i.e., an electrical charge or output voltage signal value) is read at samples S1 to Sn by the sampler 302. In step 404, the pixel output for the intermediate frame exposure may be determined by subtractor 204. For example, as described in connection with the example of FIG. 3, the pixel output for the intermediate frame exposure may be sampled by subtracting the pixel output at sample S2 from the pixel output at sample S3. The amplifier 205 may amplify the pixel output value of the intermediate exposure at step 406. Optional aspects are illustrated with a dashed line in FIG. 4. The detail processor 206 performs detail processing of the amplified pixel output value of the intermediate exposure at step 408 and produces a detail correction signal 210. This detail correction is enhanced by reducing the exposure of the motion to the reduced intermediate exposure period compared to performing detail processing on the full exposure period. In step 410, the detail correction signal 210 may be added to the pixel output value of the full exposure at summer 207, producing a final pixel output signal 208 corrected of motion blur. While detail processing may be based on the intermediate exposure, the pixel output signal 208 captures the full exposure pixel output plus the detail correction signal 210. Thus, the method 400 reduces the effect of motion blur in an image sensor pixel without any judder that would result using the conventional approach of simply shuttering the pixel output for each frame exposure to compress the motion duration within the frame.

Figure 5A:
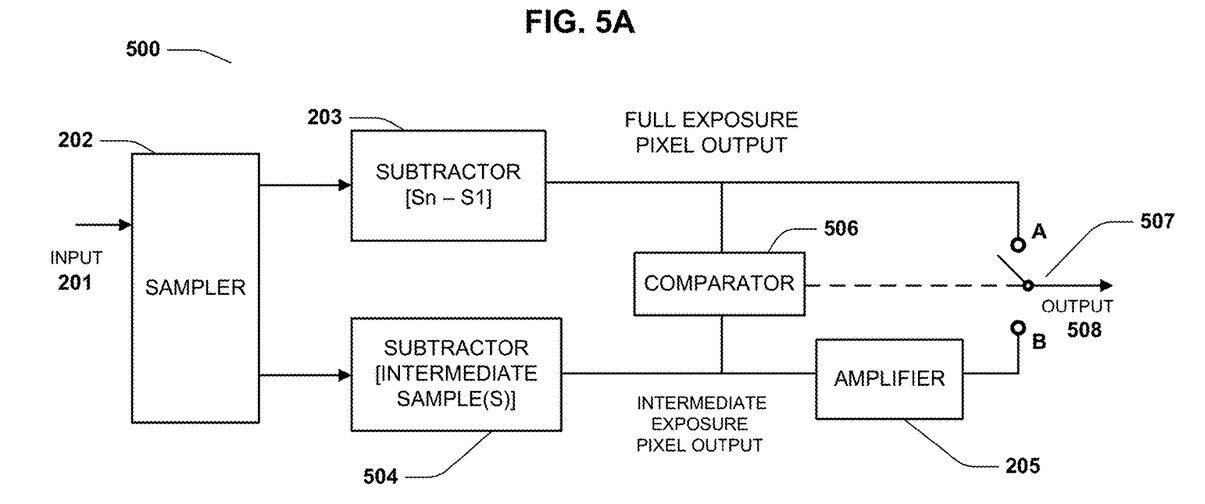
FIG. 5A is block diagram of an example motion blur reduction circuit that switches to a pixel output of an intermediate exposure in response to motion detection.

FIG. 5A is block diagram of an example motion blur reduction circuit 500 of the pixel processor 121. Input 501 of sampler 202 takes the pixel signal from image sensor 120, and reads the cumulative pixel output at multiple samples S1 to Sn. Subtractor 203 determines the full exposure pixel output as explained above with reference to FIGS. 2A and 2B. Subtractor 504 determines the intermediate exposure pixel output in a similar manner as described above with respect to subtractor 204 in FIGS. 2A and 2B. Comparator 506 is configured to exploit the intermediate exposure sampling to detect motion as shown in exposures 302, 303 in FIG. 3. In one embodiment, comparator 506 is configured to determine the ratio of full exposure duration and intermediate exposure duration. For example, where the interval between samples S2 and S3 is 50% of the full exposure interval between samples S1 and S4, comparator 506 may determine that the S3-S2 interval is half of the interval Sn-S1, and thus the pixel output during S3-S2 interval is half the pixel output for the full frame interval Sn-S1 if the pixel charge rate is constant. The comparator 506 may then compare the pixel output of the intermediate exposure to one half of the pixel output for the full exposure. If this comparison is an equal comparison, then the comparator determines that no motion is present because the expected pixel output has been confirmed to be constant (e.g., exposure 301 of FIG. 3 showing a constant pixel charge rate). If on the other hand the comparison is unequal, then comparator 506 determines that the pixel charge rate is not constant for this frame, and motion is therefore detected. Since the effect of motion blur is reduced when the duration of motion is reduced, comparator 506 operates switch 507 to position B, allowing the pixel output 508 to be derived from the intermediate exposure. Amplifier 205 normalizes the pixel output to be proportional to that of a full exposure. For the 50% intermediate exposure example, the amplifier 205 is configured to boost the pixel output value roughly by 200%. When no motion is detected by comparator 506, switch 507 is configured to move to position A in response to a control signal from comparator 506, allowing the full exposure pixel output to be transmitted as pixel output 508. Each pixel of the image sensor pixel array may be processed accordingly to generate the full digital image for the frame. Thus, depending on detection of motion in the pixel and with the switching of switch 507, a digital image may be produced having a mix of pixel outputs 508 of the full exposure and pixel outputs 508 of the intermediate exposure to form the pixel array for the full digital image.

Figure 5B:
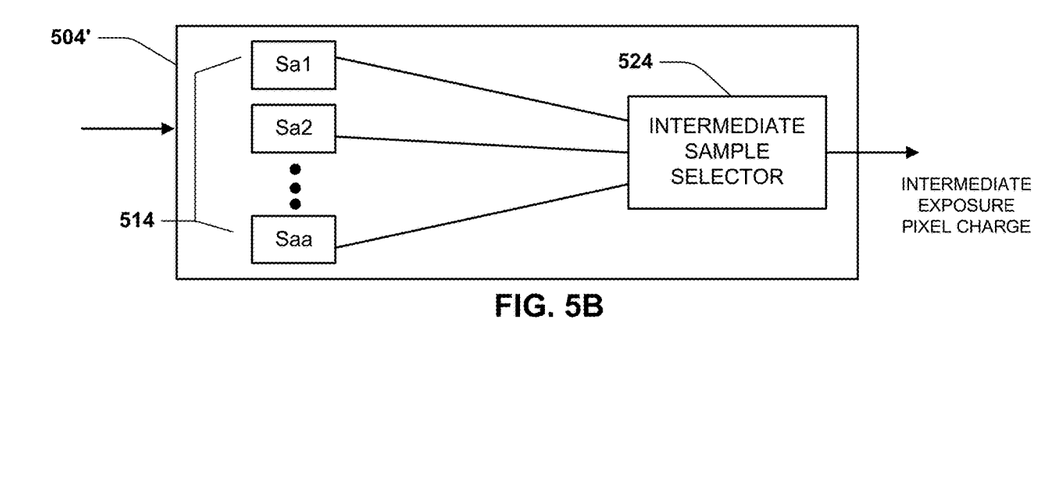
FIG. 5B is a block diagram of an example intermediate exposure processor.

FIG. 5B shows an example block diagram of an alternative embodiment for deriving the intermediate exposure pixel output. Instead of subtractor 504, an intermediate exposure processor 504' may be implemented by an intermediate exposure selector 524 which reads the intermediate samples 514 received from sampler 202, and performs a weighting algorithm which ranks each sample for the amount of motion blur and selects the sample having the least amount of blur.

Figure 6:
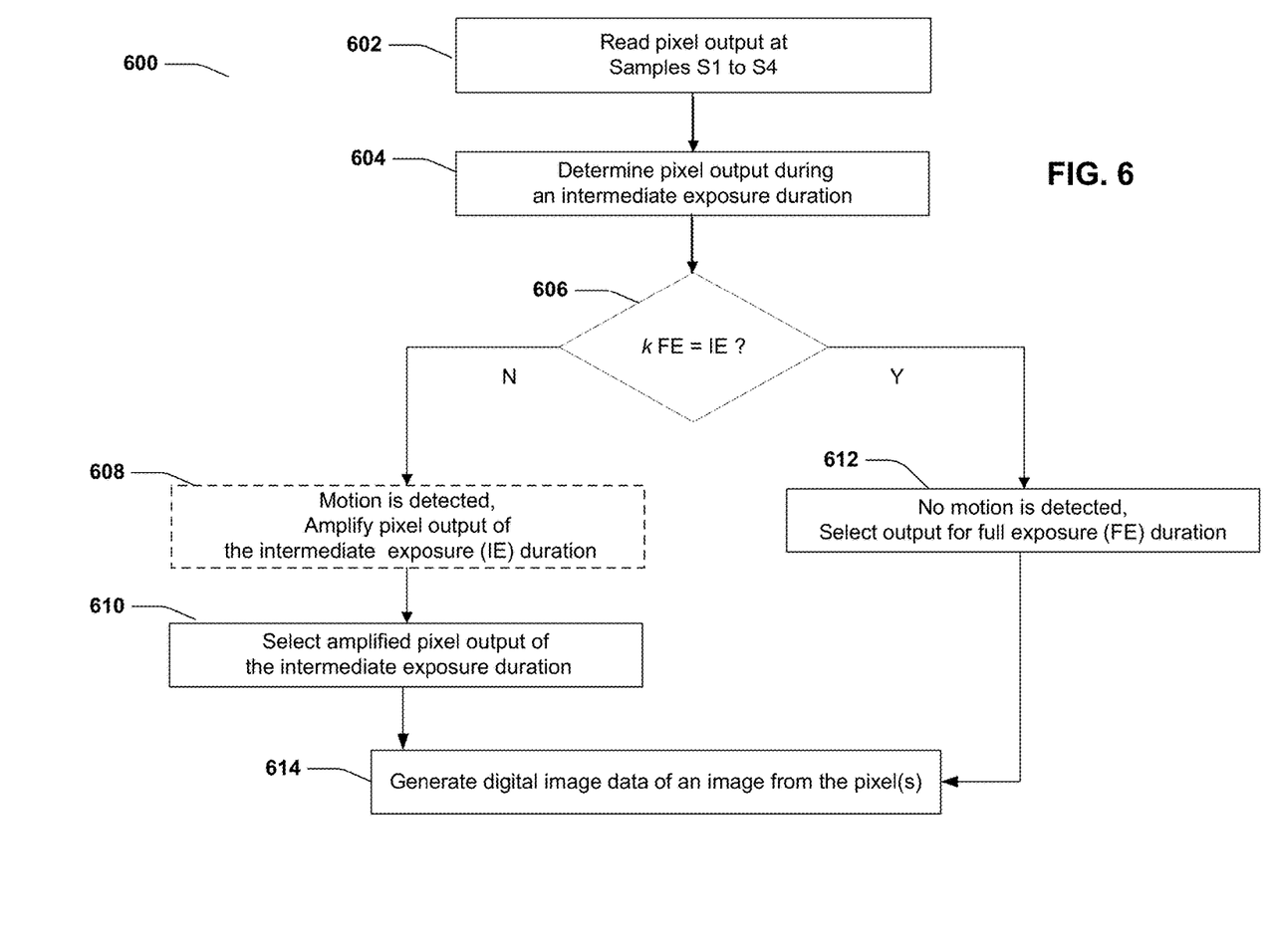
FIG. 6 is a flowchart of an example method for switching to a pixel output from an intermediate exposure when motion is detected.

FIG. 6 shows a flowchart of an example method 600 of generating an image signal with reduced motion blur. The method may be performed by at least one processor, such as pixel processor 121 or motion blur reduction circuit 500. The method may be performed by a camera such as camera system 100 to improve an image generated by the camera.

In step 602, sampler 202 reads pixel output at multiple sample points S1 to Sn. Although examples have illustrate three or four samples points, any number of samples points may be used in connection with the aspects presented herein. In step 604, subtractor 204 determines the pixel output for the intermediate exposure by subtracting the pixel output value at sample S2 from the pixel output value at sample S3. Next, at 606, comparator 506 determines a factor k based on the ratio of intermediate exposure duration to full exposure duration (e.g., if the duration of the intermediate exposure period is one half the duration of full exposure period, comparator 506 determines that k=½), and performs the following comparison test:

$$k\ FE/IE = 1,$$

where FE is full exposure pixel output, e.g., Sn-S1 and IE is intermediate exposure pixel output, e.g., S3-S2. If the comparison test is not true, then motion is detected. Motion may be movement from a brighter object to a darker object as in exposure 302 or the opposite movement is detected as in exposure 303. When motion is detected, at 610 switch 507 selects the pixel output for the output 508. At 608, the pixel output for the intermediate exposure may also be amplified by amplifier 205. If the comparison test is true, then no motion is detected and comparator 506 activates switch 507 to select the pixel output from the full exposure at 612.

At 614, digital image data of the image is generated from the pixels, e.g., to produce a signal representative of the image. This may include generating a signal based on an array of pixels for an image sensor, such as 120.

The method may further include generating digital image data from the array of pixels such that a full image for one frame duration includes a mix of pixels having selected samples when no motion is detected and selected samples when motion is detected. This may include amplifying a magnitude of the pixel output during the intermediate portion of the frame by a magnitude that balances with a magnitude of the pixel output for a full frame and performing detail processing on the amplified magnitude to produce a detail correction signal. The detail correction signal may be added to the pixel output for the full frame to produce digital image data corrected for motion blur, when an object in motion is not detected and the detail correction signal may be added to the pixel output of the intermediate portion of the frame, when an object in motion is detected.

The method may further include determining digital image data for a plurality of adjacent pixels for an object in motion that moves across the plurality of adjacent pixels during one frame duration.

The method may further include selecting at least one sample during the intermediate portion of the frame by selecting a pixel output having least amount of blur according to a weighted detail comparison of a plurality of pixel outputs. For example, additional samplings may be taken at different times within an exposure to have either a smaller or larger effect to the exposure time of the additionally produced signal. This may offer a larger improvement in the resolution and sharpness. A detail signal may be made for multiple snapshots, e.g., samples and the detail may be weighted according to an algorithm that detects the most reliable snapshot, e.g., the sample having the least amount of blur.

In another example, aspects presented herein may also be performed by generating more images per second, without the accumulation features in CMOS imagers, and adding up the individual time frames to the imagers.

The pixel processor 121 may comprise at least one processor coupled to a computer-readable medium/memory. The computer-readable medium may comprise executable code for causing the at least one processor to perform the aspects of the method illustrated in connection with FIG. 4 and/or FIG. 6.

Figure 7:
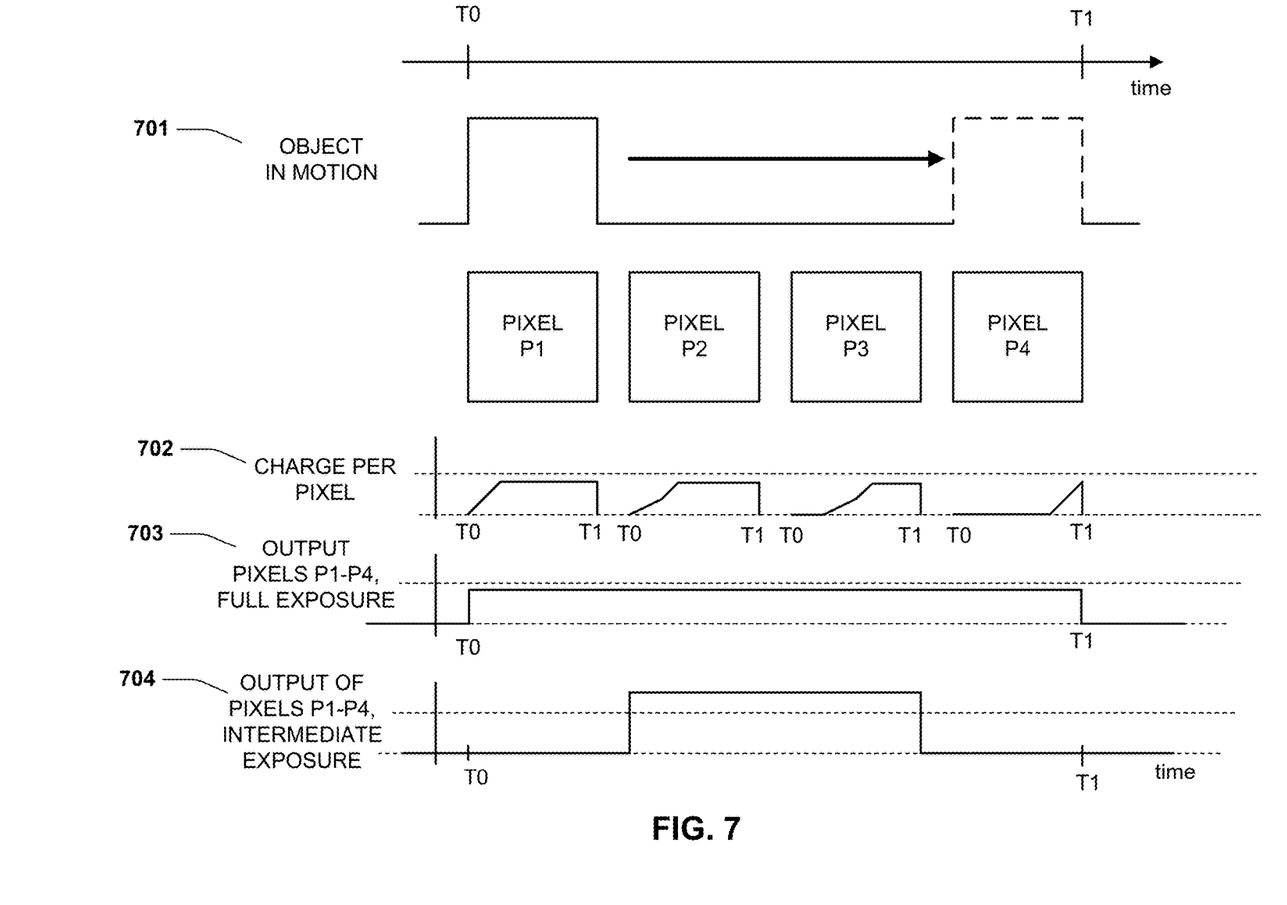
FIG. 7 is a graphical illustration of pixel charge rates and pixel output for a series of adjacent pixels exposed to an object in motion.

FIG. 7 shows a graphical illustration of an example pixel charge rate for a series of consecutive pixels of image sensor 120 as an object in motion 701 moves across the pixels. For simplicity of illustration, in this example, the object 701 is represented as a simple shape that can move evenly through the sensing region of each of four pixels, affecting the photons sensed by each image pixel. It should be understood that any combination of objects in motion and with various sizes can impact the input of photons to the image sensor pixels, and the pixel charge rates may be more complex as a result. In this example, four pixels P1 to P4 are examined, however the process may be applied for the entire array of pixels in a similar manner on a per row basis, or in blocks of pixels of a particular number. In this example, sampling is performed by sampler 202 at samples S1 to Sn, where n=4, and samples S2 and S3 occur at 25% and 75% of the full exposure time. The object in motion 701 is moving from pixel P1 toward pixel P4 for the time duration of a single exposure frame, from time T0 to time T1. As the object moves past each pixel, the pixel charge is activated as shown in pixel rate chart 702 during the exposure T0-T1. Thus, 702 illustrates how the output signal of the pixel will accumulate over time. For pixel 1, the object activates a pixel charge for roughly the first 25% of the exposure, and the accumulated charge is maintained at a constant level for the remainder of the exposure period reflecting the absence of motion as the object has moved onto pixel P2. At pixel P2, the pixel charge accumulates during the first 50% of the exposure frame. The pixel charge at pixel P3 accumulates during the middle 50% of the exposure frame, while pixel P4 accumulates pixel charge only in the final 25% of the exposure frame.

A pixel output plot 703 across the four pixels for the full exposure is shown having a constant value between time T0 and T1, where no intermediate exposure enhancement is applied. Thus, 703 illustrates how the pixel output signal of the four pixels will look at a normal exposure time.

Pixel plot 704 illustrates an output signal for the four pixels using the intermediate sample of the pixel, e.g., at 50% of the full exposure time.

After applying the detail correction by detail correction circuit 200 for the set of pixels P1 to P4, an output plot 704 illustrates the enhanced pixel output which more accurately reflects an emphasized presence of the moving object in pixels P2 and P3, (i.e., the object is sensed by pixels P2 and P3 for 50% of the exposure duration, while pixels P1 and P4 sense the object only for 25% of the exposure duration).

As shown in FIG. 7, for all pixels P1 to P4, the pixel charge between samples S3 and S2 (i.e., the intermediate exposure IE) is not equal to one half of the pixel charge between samples S4 and S1 (i.e., the full exposure FE), indicating presence of motion at each of the pixels P1 to P4 in accordance with 606 where k=½. As a result, switch 507 is controlled to accept output from amplifier 205 in accordance with step 610. Amplifier 205 enhances the pixel output for pixels P2 and P3 based on the intermediate exposure between samples S3 and S2, and thus pixel output plot 704 reflects a higher amplitude than the pixel output plot 703. For pixels P1 and P4, switch 507 takes output from amplifier 205 (step 610), but as there is zero pixel charge accumulation at samples S3 and S2, the pixel output calculated for intermediate exposure is zero in accordance with step 604. As a result, the enhanced pixel output plot 704 better reflects the image of the object at pixels P2 and P3 compared to a stretched version across pixels P1, P2, P3 and P4.

Figure 9:
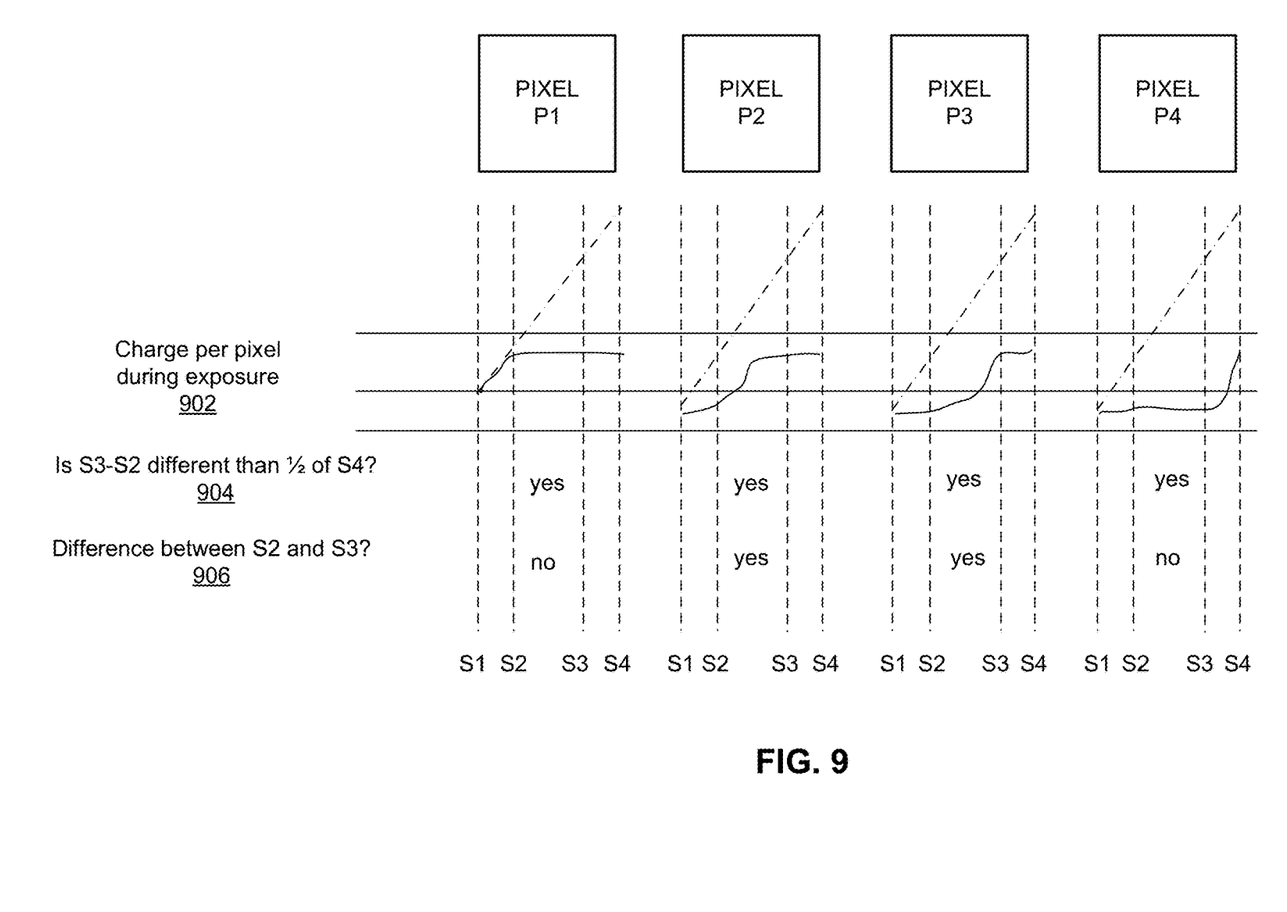
FIG. 9 is a graphical illustration of pixel charge output for a series of adjacent pixels exposed to an object in motion.

FIG. 9 further illustrates this example. 902 illustrates a charge per pixel during throughout the length of a single exposure. The pixels are sampled at 4 samples during the exposure, S1, S2, S3, and S4. In FIG. 9, the first pixel sees the object only in the first 25% of the exposure time, the second pixel in the first 50%, the third pixel in the second 50% and the third pixel in the last 25%, but at the end of the exposure, the total exposure or output at S4 all show the same level.

First, it is considered at 904 whether the signal between the second, S2, and third, S3, samples is greater than or less than ½ of the fourth sample, S4, or total exposure output. This is true for each of the pixels. As this is true for each of the samples, motion is detected, and a difference between S2 and S3 may be used, e.g., with amplification, as the output signal for the pixel.

Then, it is considered at 906 whether there is a difference between the output at S2 and S3. As there is no difference between S2 and S3 for pixels 1 and 4, the output for these pixels will be zero.

Figure 8:
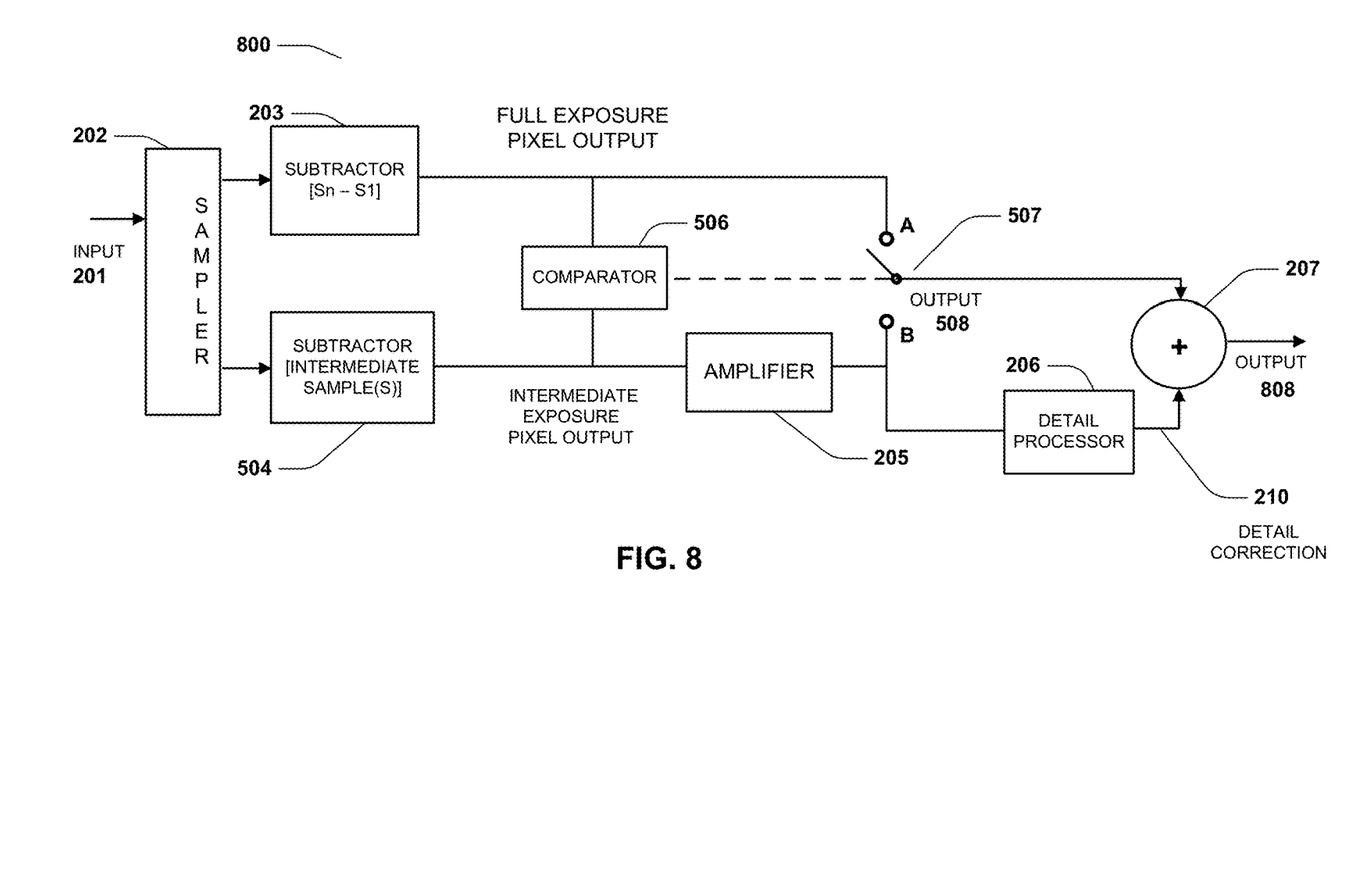
FIG. 8 is a block diagram of a detail correction circuit that combines the elements of FIG. 2A and FIG. 5A.

FIG. 8 shows an example motion blur reduction circuit 800 that combines the embodiments shown in FIG. 2A and FIG. 5A. In this example, detail correction signals generated with a reduced exposure time in the detail processor 206 may be added in summer 207 to the output 508 for full exposure (FE) duration or the amplified output for the immediate exposure (IE) duration. The output 808 depends on the detection of a motion at step 606 by comparator 506 and the resulting output selection at switch 507.

By way of example and without limitation, the aspects of the present disclosure are presented with reference to systems and methods used to configure various components of a video production system that may be used for production of television programming or at sports events. The various concepts presented throughout this disclosure may be implemented across a broad variety of imaging applications, including systems that capture and process video and/or still images, video conferencing systems and so on.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A camera system for generating an image with improved image sharpness by reducing motion blur of an object moving in the image, the camera system comprising:
    an image sensor comprising an array of pixels configured to accumulate an electrical charge representative of an image captured during a frame;
    a pixel output sampler configured to sample a pixel output for at least one pixel of the image sensor during a beginning portion of the frame, at least one intermediate portion of the frame, and at an end portion of the frame;
    a full frame exposure output configured to generate a full frame pixel output based on a difference between the sampled pixel output at the end portion of the frame and the sampled pixel output at the beginning portion of the frame;
    an intermediate frame exposure output configured to generate an intermediate exposure pixel output based on the sampled pixel output at the at least one intermediate portion of the frame;
    a detail processor configured to generate a detail correction signal from the generated intermediate exposure pixel output; and
    an image signal output module configured to apply the generated detail correction signal to the full frame pixel output to produce an enhanced pixel output for generating a digital video output for the captured image with reduced motion blur and judder.

2. The camera system according to claim 1, further comprising a comparator configured to determine a ratio of full exposure duration to intermediate exposure duration based on a first time interval between the beginning and end portions of the frame and a second interval between at least a pair of intermediate portions of the frame.

3. The camera system according to claim 2, wherein the comparator is configured to determine whether the image contains motion based on the determined ratio of the full exposure duration to the intermediate exposure duration.

4. The camera system according to claim 3, further comprising a switch controlled by the comparator and coupling the image signal output module to one of the detail processor and the full frame exposure output based on a state of the switch.

5. The camera system according to claim 4, wherein the comparator is further configured to:
    set the switch to a first state coupling the image signal output module to the full frame exposure output when no motion is detected in the image, such that the image signal output module outputs the full frame pixel output for generating the digital video output for the image; and
    set the switch to a second state coupling the image signal output module to the detail processor when motion is detected in the image, such that the generated detail correction signal is applied to the full frame pixel output to produce the enhanced pixel output for generating the digital video output for the image with reduced motion blur and judder.

6. A camera system for generating an image with improved image sharpness by reducing motion blur of an object moving in the image, the camera system comprising:
    an image sensor comprising an array of pixels configured to accumulate an electrical charge representative of an image captured during a frame;
    a pixel output sampler configured to sample a pixel output for at least one pixel of an array of pixels at one or more intermediate portions and at an end portion of an image frame;
    a full frame exposure output configured to generate a full frame pixel output based at least one the sampled pixel output at the end portion of the image frame;
    an intermediate frame exposure output configured to generate an intermediate exposure pixel output based on the sampled pixel output at the one or more intermediate portions of the image frame;
    a detail processor configured to generate a detail correction signal from the generated intermediate exposure pixel output; and
    an image signal output module configured to apply the generated detail correction signal to the full frame pixel output to produce an enhanced digital video output for the image with reduced motion blur and judder.

7. The camera system of claim 6, further comprising an image sensor comprising the array of pixels configured to accumulate an electrical charge representative of an image captured during the image frame.

8. The camera system of claim 6,
    wherein the pixel output sampler is further configured to sample a pixel output for the at least one pixel during a beginning portion of the frame, and
    wherein the full frame exposure output is further configured to generate the full frame pixel output based on a difference between the sampled pixel output at the end portion of the frame and the sampled pixel output at the beginning portion of the frame.

9. The camera system according to claim 8, further comprising a comparator configured to determine a ratio of full exposure duration to intermediate exposure duration based on a first time interval between the beginning and end portions of the frame and a second interval between at least a pair of intermediate portions of the frame.

10. The camera system according to claim 9, wherein the comparator is configured to determine whether the image contains motion based on the determined ratio of the full exposure duration to the intermediate exposure duration.

11. The camera system according to claim 10, further comprising:

a switch controlled by the comparator and coupling the image signal output module to one of the detail processor and the full frame exposure output based on a state of the switch, wherein the comparator is further configured to:
set the switch to a first state coupling the image signal output module to the full frame exposure output when no motion is detected in the image, such that the image signal output module outputs the full frame pixel output for generating the digital video output for the image; and set the switch to a second state coupling the image signal output module to the detail processor when motion is detected in the image, such that the generated detail correction signal is applied to the full frame pixel output to produce the enhanced pixel output for generating the digital video output for the image with reduced motion blur and judder.

12. The camera system of claim 11, further comprising an image sensor comprising the pixel array having a plurality pixels configured to accumulate an electrical charge representative of the captured image captured during the frame.

13. The camera system of claim 12, wherein the pixel output sampler is configured to sample a pixel output for each of the plurality of pixels to generate the sampled intermediate pixel output and the sampled end pixel output sampled.

14. The camera system of claim 13, wherein the pixel output sampler is further configured to sample a plurality of intermediate pixel outputs of the plurality of pixels during respective intermediate portions of the frame, and wherein the correction signal is generated based on the sampled plurality of intermediate pixel outputs.

15. A camera system for generating an image with improved image sharpness by reducing motion blur of an object moving in the image, the camera system comprising:
a pixel output sampler configured to sample a pixel output for at least one pixel in a pixel array at a beginning portion of a frame of a captured image, an intermediate portion of the frame and an end portion of the frame;
a cumulative pixel output determination module configured to determine a cumulative pixel output by subtracting the pixel output sampled at the beginning portion from the sampled pixel output at the end portion of the frame; and
a digital video output enhancer configured to apply a correction signal generated from a sampled intermediate pixel value of the at least one pixel to the determined cumulative pixel output to enhance a digital video output of the captured image with reduced motion blur and judder.

16. A camera system for generating an image with improved image sharpness by reducing motion blur of an object moving in the image, the camera system comprising:
a cumulative pixel output determination module configured to determine a cumulative pixel output for at least one pixel in a pixel array based on a sampled end pixel output of a frame of a captured image; and
a digital video output enhancer configured to apply a correction signal generated from a sampled intermediate pixel value of the at least one pixel to the determined cumulative pixel output to enhance a digital video output of the captured image with reduced motion blur and judder; and
an image correction signal generator configured to:

amplify a magnitude of the sampled intermediate pixel value by a magnitude that balances with a magnitude of the cumulative pixel output; and
perform detail processing on the amplified magnitude to produce the correction signal; and
add the correction signal to the cumulative pixel output to enhance the digital video output.

17. A camera system for generating an image with improved image sharpness by reducing motion blur of an object moving in the image, the camera system comprising:
a cumulative pixel output determination module configured to determine a cumulative pixel output for at least one pixel in a pixel array based on a sampled end pixel output of a frame of a captured image; and
a digital video output enhancer configured to apply a correction signal generated from a sampled intermediate pixel value of the at least one pixel to the determined cumulative pixel output to enhance a digital video output of the captured image with reduced motion blur and judder; and
a comparator configured to determine whether the captured image contains motion based on a ratio of full exposure duration to intermediate exposure duration based on a first time interval between a beginning portion and an end portion of the frame of the captured image and a second interval between a pair of a plurality of intermediate portions of the frame.

18. The camera system according to claim 17, wherein the digital video output enhancer applies the correction signal to the determined cumulative pixel output to enhance the digital video output of the captured image only when the comparator determines that the captured image contains motion.

19. A camera system for generating an image with improved image sharpness by reducing motion blur of an object moving in the image, the camera system comprising:
a cumulative pixel output determination module configured to determine a cumulative pixel output for at least one pixel in a pixel array based on a full pixel exposure for an electrical charge accumulated by the at least one pixel during a frame and representative of portion of the image captured by the pixel array; and
a digital video output enhancer configured to apply a correction signal generated from a sampled intermediate pixel value of the at least one pixel to the determined cumulative pixel output to enhance a digital video output of the captured image with reduced motion blur and judder.

20. The camera system of claim 19, further comprising an image sensor comprising the pixel array having a plurality pixels configured to accumulate an electrical charge representative of the captured image captured during the frame.

21. The camera system of claim 20, further comprising a pixel output sampler configured to sample a pixel output for each of the plurality of pixels to generate the sampled intermediate pixel output and the sampled end pixel output sampled.

22. The camera system of claim 21, wherein the pixel output sampler is further configured to sample a plurality of intermediate pixel outputs of the plurality of pixels during respective intermediate portions of the frame, and wherein the correction signal is generated based on the sampled plurality of intermediate pixel outputs.

23. The camera system of claim 19, further comprising an image correction signal generator configured to:

amplify a magnitude of the sampled intermediate pixel value by a magnitude that balances with a magnitude of the cumulative pixel output; and perform detail processing on the amplified magnitude to produce the correction signal; and add the correction signal to the cumulative pixel output to enhance the digital video output.

24. The camera system according to claim 22, further comprising a comparator configured to determine a ratio of full exposure duration to intermediate exposure duration based on a first time interval between a beginning portion and an end portion of the frame and a second interval between a pair of the plurality of intermediate portions of the frame.

25. The camera system according to claim 24, wherein the comparator is configured to determine whether the captured image contains motion based on the determined ratio of the full exposure duration to the intermediate exposure duration.

26. The camera system according to claim 25, wherein the digital video output enhancer applies the correction signal to the determined cumulative pixel output to enhance the digital video output of the captured image only when the comparator determines that the captured image contains motion.

* * * * *